United States Patent [19]
Moricca

[11] 3,988,536
[45] Oct. 26, 1976

[54] SCANNING APPARATUS FOR TELEVISION DISPLAY OR PICK-UP

[76] Inventor: Anthony C. Moricca, 7137 Rose Ann Parkway, Fort Wayne, Ind. 46804

[22] Filed: Dec. 30, 1974

[21] Appl. No.: 537,267

[52] U.S. Cl. .............................. 178/7.1; 178/7.3 D; 315/151; 315/169 TV; 250/213 A; 250/208
[51] Int. Cl.² ..................... H04N 3/12; H01J 39/12; H01J 31/50; H05B 37/00
[58] Field of Search ............. 178/6, 6.8, 7.1, 7.3 D; 250/211 J, 208, 213 A, 213 R, 578; 315/169 TV, 169 R, 151; 340/324 M, 166 EL, 166 R; 358/59

[56] References Cited
UNITED STATES PATENTS

| | | | |
|---|---|---|---|
| 2,881,360 | 4/1959 | Livingston | 340/166 EL |
| 2,900,574 | 8/1959 | Kazan | 250/213 A |
| 3,020,410 | 2/1962 | Bowerman | 250/213 A |
| 3,078,373 | 2/1963 | Wittenberg | 250/213 A |
| 3,110,763 | 11/1963 | Lieb | 178/6 |
| 3,223,886 | 12/1965 | Glaser | 178/213 A |
| 3,258,628 | 6/1966 | Acton | 313/505 |
| 3,617,823 | 11/1971 | Hofstein | 250/211 J |

*Primary Examiner*—John C. Martin

[57] ABSTRACT

A scanning apparatus having a sequential linear array of electroluminescent devices which are controlled to be successively illuminated by having a pulsed electrical signal applied thereto by means of connections between said devices which insure that only one electroluminescent device at a time is illuminated for a predetermined time, which may be relatively short. Further circuitry provides the sequential enablement of a grid matrix having a plurality of horizontal lines and a plurality of vertical lines in overlying relationship which have a video transducer connecting the horizontal and vertical line at each intersection of the grid matrix so formed. All of the horizontal lines are enabled in sequence for each enablement of a vertical line and the vertical lines are enabled in sequence, or vice versa, thereby providing a complete scan of the grid area.

7 Claims, 8 Drawing Figures

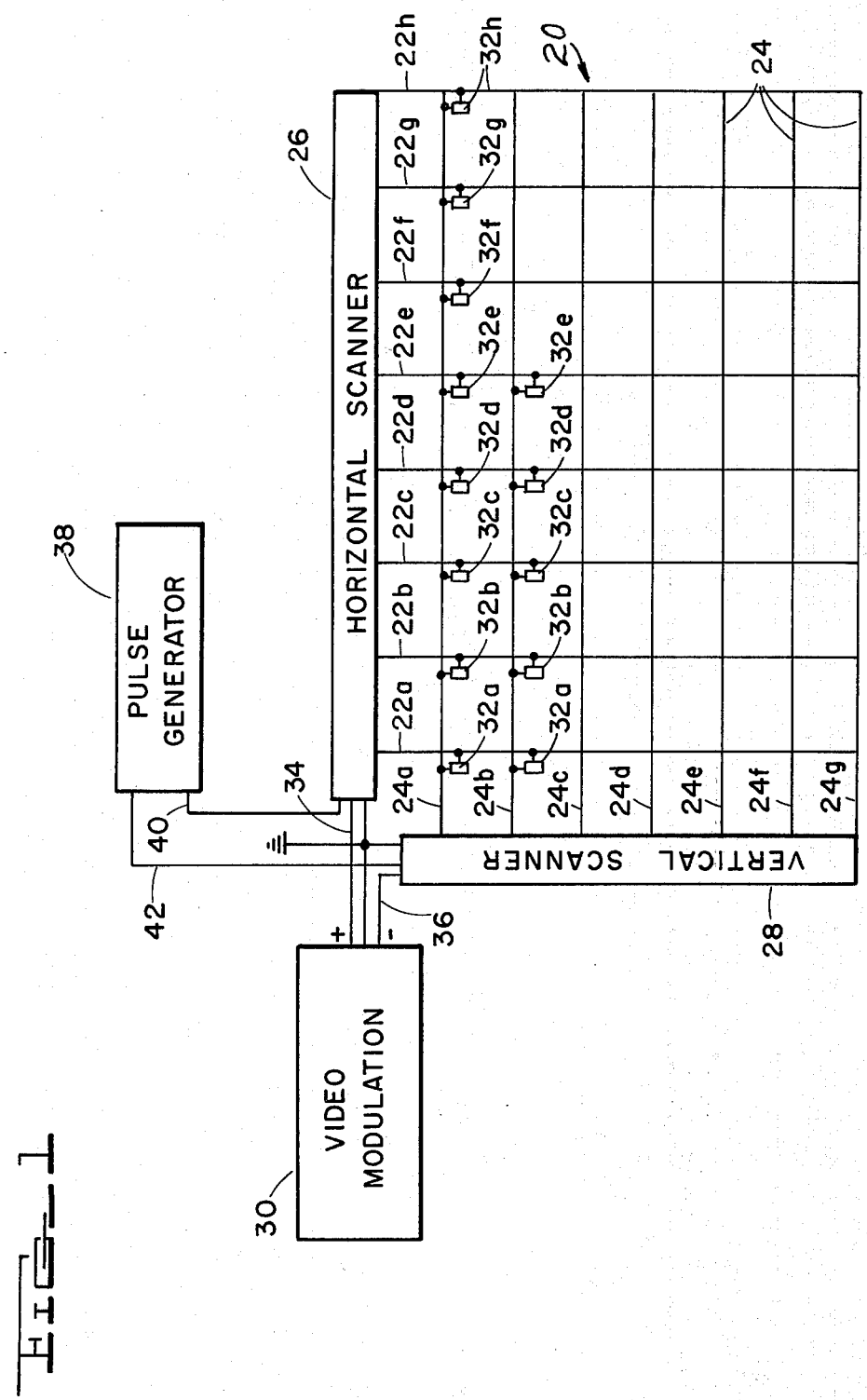

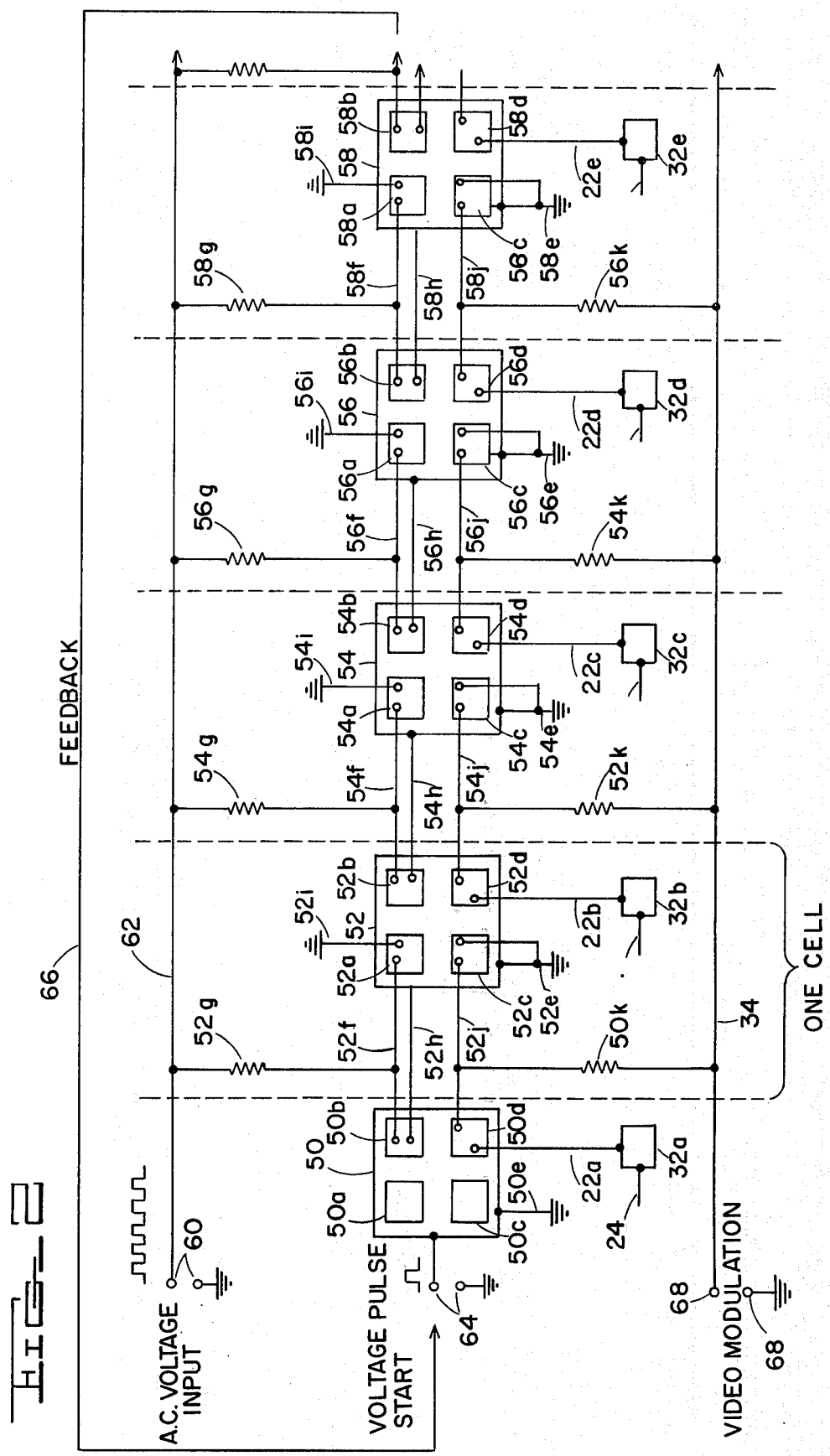

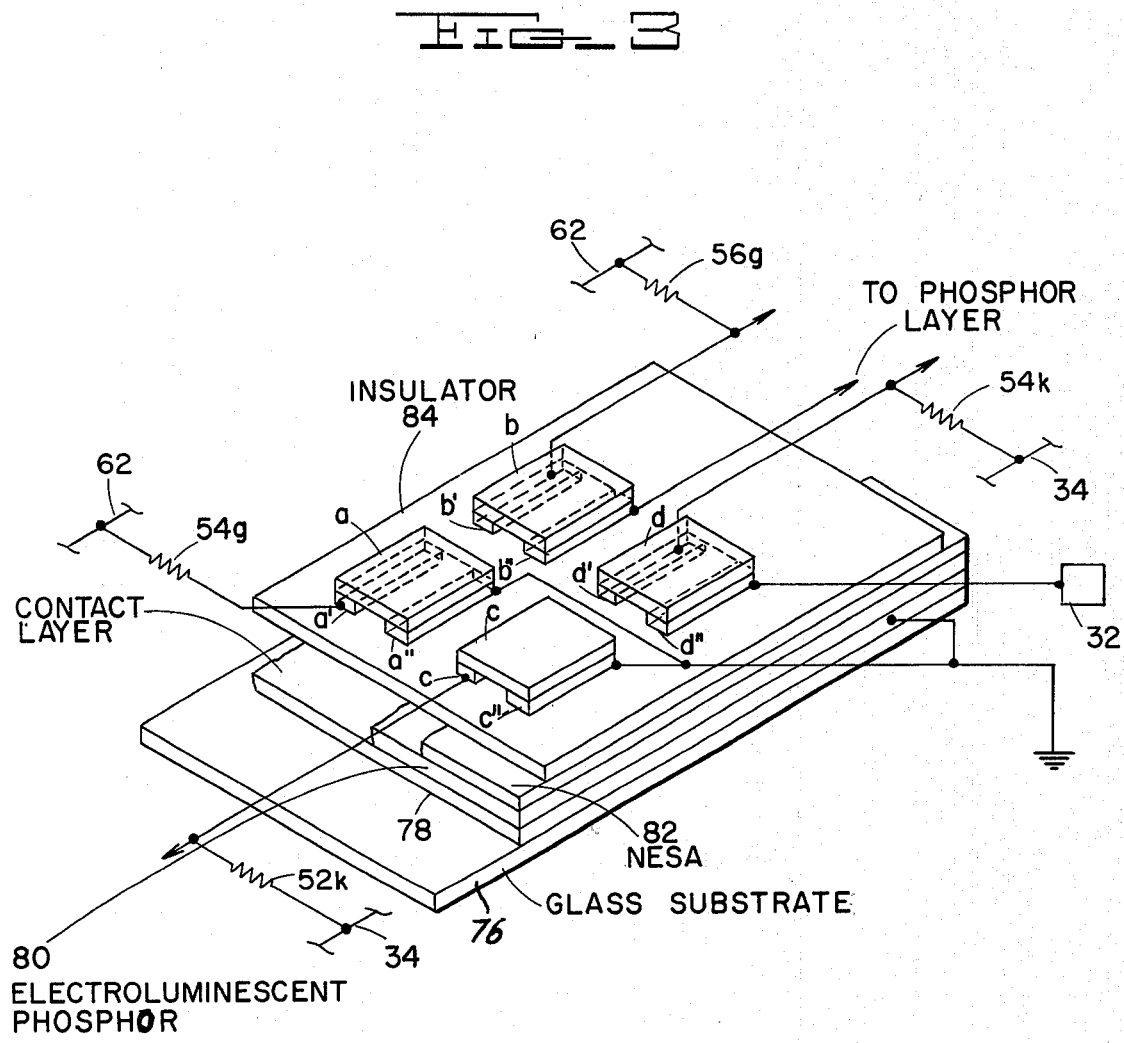

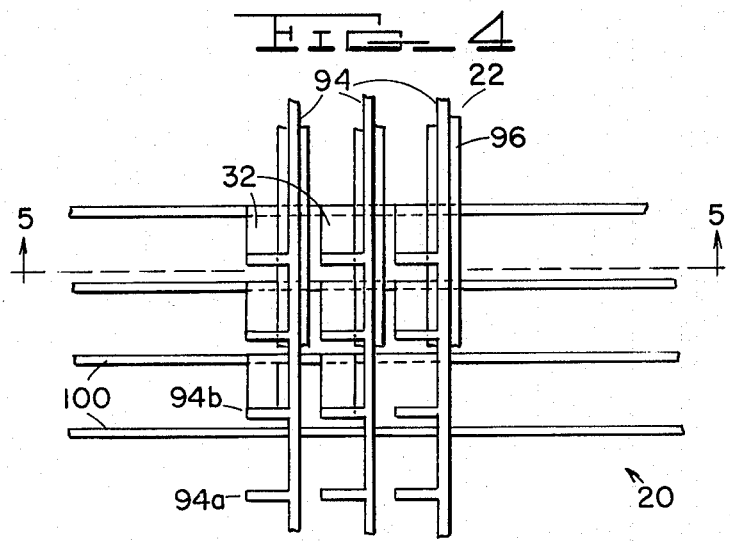
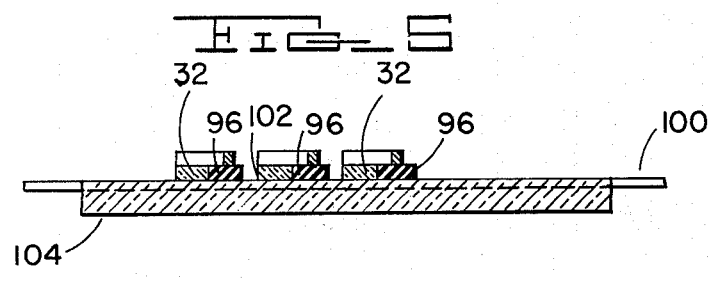
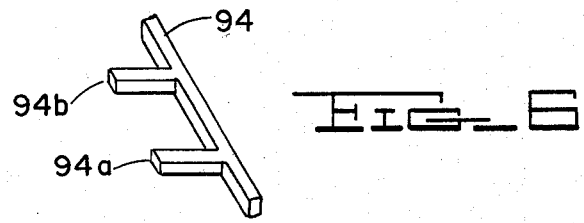
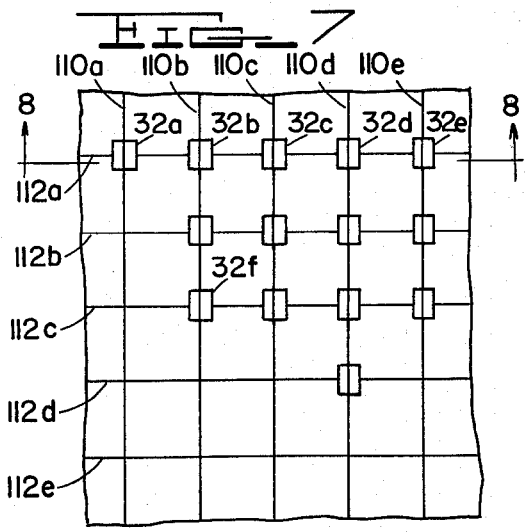
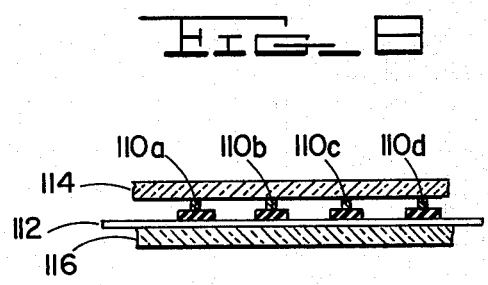

SCANNING APPARATUS FOR TELEVISION DISPLAY OR PICK-UP

BACKGROUND OF THE INVENTION

Field of the Invention

Conventional scanning devices usually embody a form of cathode ray tube, with camera pick-up tubes employing, for example, a photoconductive target, and kinescopes having luminescent phosphor screens. These tubes have certain undesirable characteristics such as size, weight, power requirements, and reliability. These limitations are well known to the art and numerous attempts have been made to provide a scanning apparatus which is lighter, smaller and more reliable in an effort to obtain, among other products, a "flat television picture or pick-up tube". This invention provides a novel combination of elements in the form of a flat display or pick-up device.

SUMMARY OF THE INVENTION

The scanning apparatus of this invention comprises a plurality of sequentially arranged electroluminescent elements or chips, of a phosphor material, sequentially energized. A single chip is associated with each of a plurality of vertical lines in a grid matrix for sequentially energizing said lines. The number of lines are chosen to provide a desired resolution.

In like manner, a plurality of sequentially arranged and energized electroluminescent phosphor chips are provided for attachment to and sequential energization of a plurality of horizontal and vertical lines, respectively, the the grid matrix, which are in overlying relation. At each intersection of a horizontal and vertical line in the matrix, a video transducer is connected which converts an electric signal to a luminous signal for a video display device, or from a luminous signal to an electric signal for a video pick-up device. Again, the number of horizontal and vertical lines are selected to provide for the desired resolution.

When the scanning apparatus is utilized for a display device, modulating signals are applied to both the vertical and horizontal grid lines through controls on the respective chips to correspondingly illuminate the respective video transducer elements. In the case of a video pick-up device, modulating signals are developed at a modulating grid intersection upon the illumination of the grid area and these modulating signals are applied to the lines through control devices on the phosphor chip.

Each phosphor chip has four control or switching devices associated therewith. These control devices, in a preferred embodiment, are small subchips of a photoconductive material which are in light-receiving relation to the phosphor chip so that when the phosphor chip is illuminated, the resistance of the photoconductive devices becomes very low and when the phosphor chip becomes dark, the resistance of the photoconductive subchips becomes high. A pulse source is provided for energizing the phosphor chips, and this source is applied to a phosphor chip through a photoconductive control device of the next previous phosphor chip. In scanning, a start pulse is applied to the first phosphor chip in a sequence of chips and a feedback line connects the last phosphor chip control device to the first chip to provide the necessary control function. In this manner, as a preceding phosphor chip becomes illuminated, the next succeeding chip becomes energized at a later time depending upon the time lag of the photoconductive control device and the time lag in bringing the succeeding phosphor chip up to full illumination along with the frequency of the pulses applied in the energizing line.

A second photoconductive control device on each chip connects the energizing pulses for that chip to ground so that as the chip reaches full illumination the power to the chip becomes grounded thereby causing the phosphor chip to become de-energized and hence to become dark. This prevents a phosphor chip from remaining illuminated.

A third photoconductive control subchip on each phosphor chip connects the modulating line to the respective vertical or horizontal grid line and electrical connection is made therebetween as the phosphor chip becomes illuminated.

The fourth photoconductive control subchip on each phosphor chip connects the modulating voltage from the previous phosphor chip to ground so that as a phosphor chip becomes illuminated, the modulating signal from the previous chip is grounded so that only one matrix line is energized at a time.

It is an object of this invention to provide a scanning device utilizing electroluminescent and photoconductive elements coupled together in a sequencing curcuit.

It is another object to provide a video image pick-up or display device in substantially flat, panel form.

It is still another object to provide a unique cross-grid matrix having video transducers and the respective intersections thereof.

The above-mentioned and other features and objects of this invention and the manner of attaining them will become more apparent and the invention itself will be best understood by reference to the following description of an embodiment of the invention taken in conjuction with the accompanying drawings.

BRIEF DESCRIPTION OF THE DRAWINGS

FIG. 1 is a partial block diagram of an embodiment of this invention showing a grid matrix having video transducing elements at the respective intersections of the grid lines, and circuitry for sequentially energizing the vertical and horizontal lines in the matrix;

FIG. 2 is a partial schematic drawing of a plurality of sequentially connected electroluminescent phosphor chips in one of the vertical and horizontal line-energizing circuitry, each electroluminescent phosphor chip having photoconductive control subchips superimposed thereon for energizing a respective one of a set of parallel lines in the grid matrix of FIG. 1;

FIG. 3 is a view in perspective of a single electroluminescent chip having four photoconductive subchips superimposed thereon;

FIG. 3a is a sectional view taken substantially along section line 3a—3a of FIG. 3;

FIG. 4 is a partial plan view of a possible arrangement of the matrix shown in block diagram in FIG. 1 when used as a photo display device;

FIG. 5 is a sectional view taken along section line 5—5 of FIG. 4;

FIG. 6 is a view in perspective of a partial matrix line;

FIG. 7 is a schematic view of a partial matrix of the type shown in FIG. 1 used as a display device; and FIG. 8 is a sectional view taken substantially along section line 8—8 of FIG. 7.

DESCRIPTION OF A PREFERRED EMBODIMENT

Shown in FIG. 1 is a crossed grid matrix 20 having a plurality of vertical lines 22a—22h and a plurality of horizontal lines 24a–24g of conductive material. Lines 22a–22h overlie and are insulated from lines 24a–24g. Lines 22a—22h are sequentially energized by horizontal scanner 26 while lines 24a–24g are sequentially energized by vertical scanner 28. Video modulation circuit 30 is connected to both scanners 26 and 28 which selectively apply video modulation signals to or receive video signals from lines 22a–22h and 24a–24g depending upon whether the matrix is used as either a display or camera device.

Interconnecting the junctures of lines 22a–22h and 24a–24g are video transducing elements 32a–32h which, when the matrix 20 is used as a camera device, convert the illumination received to corresponding electrical signals which are sampled by scanners 26, 28 and which modulate a carrier in video modulation circuit 30. In this case, video modulation circuit 30 may be regarded as a television transmitter.

When the device of FIG. 1 is used as a video display device, video signals generated by the modulation circuit 30 are applied through scanners 26 and 28 sequentially to each element 32a–32h; for example, the video signals will be applied first to the element 32a in the upper left hand cornr of the matrix connected to lines 22a and 24a and then in rapid sequence to each element 32b–32h connected to the first horizontal line 24a, then to each element 32a–32h in the second horizontal line 24b, and so forth until each element 32a–32h in the matrix has been energized by a video signal at which time the matrix scan begins again with the element 32a in the upper left hand corner. The entire time for modulating each element is sufficiently fast so that a continuous image is presented to the human eye, as is well known in the art. Modulation of the elements 32a–32h in matrix 20 are synchronized such that the transmitted picture, assumbing circuit 30 to be a television receiver, is accurately reproduced by the matrix. Also, the elements 32a–32b are sufficiently close together to provide the desired resolution but are shown in spaced apart relation in FIG. 1 for purposes of clarity. Video signals for horizontal scanner 26 are provided in line 34 while the same video signals but of opposite polarity for vertical scanner 28 are provided in line 36.

While the invention is described herein in connection with either presenting a television display or developing a television image, other electronic display and pick-up devices are comprehended which require different scan rates or require different light levels with respect to the transducing elements 32a–32h such as might be used in alpha-numeric displays or pick-up.

Each scanner 26, 28 receives energizing pulses from a square wave, pulse generator 38 with output line 40 being connected to scanner 26 and output line 42 to scanner 28. The pulses on line 40 and the time constants of scanner 26 are designed for a first scan rate of lines 22a–22h. The pulse frequency from generator 38 on line 42 to scanner 28 and the time constants of scanner circuit 28 are designed for a second scan rate of lines 24a–24g, significantly lower than the first scan rate. Thus, each line 22a–22h is sequentially scanned during the time for scanning one of the lines 24a–24g. Every element 32 on line 24a will be enabled from left to right; then every element 32 on line 24b will be enabled from left to right until all the elements 32 in matrix 20 have been enabled. Of course, the scan rates from scanners 26 and 28 could be reversed so that each line 24a–24g would be scanned during the scanning time for one line 22a –22h.

FIG. 2 is a partial view showing five electroluminescent phosphor chips 50–58 of one scanner 26, 28 (scanner 26 being shown) which contains as many chips as respective lines 22 and 24. Superposed on each clip in light receiving relation are four photoconductive control subchips or switching elements which for chip 50 are subchips 50a, 50b, 50c and 50d. The photoconductive subchips for the remaining phosphor chips 52–58 are numbered the same with the suffix letters a–d added. Each phosphor chip 50–58 has a ground connection 50e to 58e, respectively.

Square wave voltlage pulses at a suitable repetition rate are applied to terminals 60 from pulse generator 38. A voltage "start" pulse is applied from generator 38 to terminals 64 and is conducted to phosphor chip 50 when the scanner is initially switched "on" but after it is in operation, it will automatically receive a start pulse from feed-back line 66 later described. Video circuit 30 is connected to terminals 68 so that video signals are present on line 34.

The photoconductive subchip circuitry will now be described. Referring to phosphor chip 52, photoconductive subchip 52a has a terminal connected by line 52f to resistor 52g to which is applied the line 62 square wave signal. Line 52f is also connected to a terminal of photoconductive subchip 50b of preceding phosphor chip 50. Subchip 50b is also connected to phosphor chip 52 through line 52h. Subchip 52a is grounded by line 52i.

Photoconductive subchip 52c is connected through line 52j to subchip 50d of the next preceding phosphor chip 50 and also to modulation line 34 through resistor 50k. In addition, subchip 52c is grounded by line 52e. Subchip 52d is connected to video transducer element 32b through line 22b and also to subchip 54c of the next succeeding phosphor chip 54 through line 54j and modulation line 34 through resistor 52k. Each phosphor chip 52, 54, 56, 58 is in like manner connected to the next preceding and next succeeding photoconductive subchips as well as to lines 62, 34 and 22 as shown.

While only the scanner 26 is shown and described, it will be understood that the scanner 28 is identically constructed except for the number of phosphor and subchip assemblies, time constants thereof and pulse rate from generator 38 as will appear from the following description.

OPERATION

When a voltage start pulse is applied to terminals 64, a voltage signal is developed across phosphor chip 50 through line 50e to ground causing chip 50 to luminesce. As chip 50 comes up to brightness according to its rise time, each photoconductive subchip 50a to 50d progressively decreases in resistance closing the circuits between their respective terminals. Modulation line 34 is connected through resistance 50k and photoconductive subchip 50d to video transducer element 32a via matrix line 22a. Also, a circuit is established from line 62, which carries the square wave energizing pulses, through subchip 50b which now acts as a closed switch, line 52h to phosphor chip 52 to ground via line 52e placing a progressively increasing voltage across chip 52 causing it to luminesce according to its rise time.

As base chip 52 comes up to brightness, all of the photoconductive subchips 52a to 52d lower in resistance to close the circuits between their respective terminals. Subchip 52a closes the circuit between line 52f and ground line 52i thereby shorting or killing the voltage pulse across chip 52 causing it to extinguish according to its decay time. At the same time, the circuit for energizing the next succeeding phosphor chip 54 becomes closed by virtue of the lowered resistance of photoconductive subchip 52b which connects line 62 through resistance 54g and line 54f to line 54h which causes a voltage drop across chip 54 to ground line 54e causing chip 54 to luminesce according to its rise time. Further, the modulation signal to video transducer element 32a is grounded by virtue of the closing of the connection between lines 52j and ground line 52e through photoconductive subchip52c. In like manner, the modulation line 34 is connected to video transducer element 32b via lines 54j and 22b through the lowered resistance of photoconductive chip 52d due to the luminescence of chip 52.

Therefoe, when each phosphor chip 52 to 58 becomes luminescent, the following events occur. Energizing voltage thereto is shorted to ground via the subchip a thereon causing the phosphor chip to progressively extinguish according to its decay time; a circuit is closed via subchip b which energizes the next succeeding phosphor chip; a circuit is closed via subchip c which shorts the circuit from the modulation signal line 34 to the video transducer in the matrix array of the next preceding phosphor chip; and a circuit is closed via subchip d which connects the modulation signal to the respective video transducer element 32 in the matrix array.

Thus, in each scanner 26, 28 the phosphor chips are energized and extinguished in sequence thereby connecting the lines 22 and 24 of the matrix 20 in sequence to the modulation circuit 30 according to the scan rates of scanners 26 and 28, respectively. Typical scan rates have been explained previously.

FIG. 3 illustrates, in exaggerated form, the construction of one control device or phosphor chip assembly composed of one of the phosphor chips of FIG. 2 with four photoconductive subchips or elements a through d superposed thereon. This assembly is in flat laminated form beginning with a flat glass plate or substrate 76 having a film 78 of conductive material such as silver or nesa (stannous chloride) on which is superposed a layer 80 of electroluminescent phosphor. On the phosphor layer 80 is a contact film 82 of transparent, electrically conductive nesa or stannous chloride, on which is superposed a layer 84 of transparent insulating material, such as polyester film or glass. Superposed on the insulator 84 are four photoconductive subchips a, b, c and d orthogonally spaced as shown. Two electrical contacts or terminals are provided for each subchip and appear as elongated, rectangular bars a', a'', b', b'', c', c'', and d', d'', these bars denoted by the same letter being spaced apart and parallel and in electrical contact with the opposed edge portions of the respective subchip of the same letter. These letters correspond to the subchip letters appearing in FIG. 2.

A varying voltage of suitable magnitude applied to the two contact layers 78 and 82 will cause the phosphor layer 80 to luminesce. Radiation from this layer 80 penetrates the transparent contact film 82 and layer 84 to impinge on the photoconductive subchips a through d. If desired, the contact bars a' through d'' may also be made of a suitable transparent material or sufficiently thin as to be transparent to this radiation such that the entire area of the photoconductive subchip is illuminated. By illuminating the entire area of the subchip, maximal change of resistance of the subchip when illuminated is obtained which provides the lowest possible resistance between the two respective contact bars such as bars a' and a''. On the other hand, in the absence of radiation from the phosphor layer 80 when the latter is dark, the subchips a through d will be at high resistance thereby providing a high resistance or essentially an open circuit between the respective contact bars, such as bars a' and a''.

The photoconductive material of the subchips a through d is conventional, cadmium-sulphide properly doped with one or more impurity materials in the form of a thin film which is translucent being preferred. Thus, radiation from the phosphor layer penetrates essentially the entire thickness of the subchips thereby affecting the total cross-sectional resistance thereof.

FIGS. 4, 5 and 6 show a construction which may be used for the matrix 20 of FIG. 1. Parallel, vertical conductors 94 of, for example, printed circuit copper, corresponding to lines 22 of FIG. 1, each having a plurality of lateral connections 94a, 94b equally spaced apart and electrically connected to video transducing elements 32 are supported on flat, elongated strips 96 of insulation equally spaced and parallel. Horizontal conductors 100 corresponding to lines 24 of FIG. 1 underlie veritcal conductors 9 and are insulated therefrom by strips 96. Conductors 100 are also electrically connected to video transducing elements 32 which may be photoconductive or electroluminescent as previously discussed. Conductors 100 are spaced apart and parallel and are embedded in a transparent substrate 104 of glass or plastic for support. Vertical conductors 94 correspond to vertical conductors 22a-22h in FIG. 1 and connect to the horizontal scanner 26 as shown in the circuit diagram of FIG. 2. Conductors 100 corresponding to lines 24a-22g connect to the vertical scanner 28 as shown in FIG. 1.

When one vertical and one horizontal conductor 94, 100 are energized, the particular transducing element 32 connected between the energized lines will become enable in the circuit. In FIGS. 4–6, the video transducing elements 32 are photoconductive so that the matrix may be characterized as a video pick-up device for use as a camera.

The elements 32 (FIGS. 4–6) preferably are rectangular, thin film chips of photoconductive material, such as cadmium sulphide like the subchips of FIG. 3. One edge portion of a chip 32 is conductively secured to the respective stub contact 94, while the opposed edge portion is conductively secured to a section of the conductor 100. With the conductors 94 and 100 disposed in parallel planes, the chips 32 thus mounted are coplanar and present an essentially flat surface onto which an optical image may be projected.

FIGS. 7 and 8 show a structure which may be utilized as a video display device. Vertical lines 110a–100e are made of a conductive material such as copper in a printed circuit, and engage conductively video transducing elements 32a–32e. These elements 32a to 32e are of an electroluminescent phosphor material. Horizontal lines 112a–112e are made of a conductive material also as copper in a printed circuit, and underlie each phosphor element 32a to 32e and are in electrical contact therewith. Transparent plates 114, 116 of insulating material such as glass or plastic, carry the lines 110 and 112, respectively, and provide support for the structure. Lines 110a–110e correspond to lines 22a–22h in the device of FIG. 1 and lines 112a–112e correspond to lines 24a–24g. Assuming that line 110b is energized by horizontal scanner 26 and line 112c is energized by vertical scanner 28 then phosphor element 32f will be excited into luminescence. When the scans are of sufficiently high frequency, the matrix will display a picture appearing continuous to the human eye according to the modulation from circuit 30.

While preferred embodiments have been described to illustrate the teachings of this invention, various modifications and changes will be apparent to those skilled in the art and would still be within the scope of this invention which is defined in the following claims.

What is claimed is:

1. For use in a scanning apparatus, a control device including a layer of electroluminescent phosphor, contacts for said phosphor layer for applying energizing voltage thereto, a transparent insulating layer superposed said phosphor layer, at least three film-like elements of photoconductive material superposed upon and spaced from said insulating layer and said film-like elements each being supported by two elongate contacts spaced apart.

2. The control device of claim 1 in which there are four of said film-like elements superposed said phosphor layer,
    the contacts for said phosphor layer being in layer form with the contact layer contiguous to said layer of insulation being transparent to radiation emitted by said phosphor layer.

3. Scanning apparatus comprising a plurality of electroluminescent elements arranged in sequence which luminesce in response to an energizing electrical signal applied thereto,
    energizing circuit means for applying an energizing electrical signal to each said element to cause liminescence thereof,
    photoconductive circuit means including a first photoconductive switching device for each electroluminescent element in light-receiving relation to said element for extinguishing the latter by removing said electrical signal in response to light received therefrom,
    said energizing circuit means being connected to each of said elements through said photoconductive circuit means for applying an electrical signal sequentially thereto, said photoconductive circuit means includng a second photoconductive switching device for each electroluminescent element for conductively connecting said energizing circuit means to each electroluminescent element upon luminescence of the preceding element whereby said elements are caused to luminesce and extinguish in sequence,
    said energizing circuit means includes a source of voltage pulses recurring at a predetermined repetition rate,
    each electroluminescent element has its first and second photoconductive switching devices disposed in light-receiving relation thereto, each second switching device of each electroluminescent element being series connected between said energizing circuit means and the next succeeding electroluminescent element, the first switching device of each electroluminescent element being shunt connected across said electroluminescent element whereby luminescence of each electroluminescent element results in shorting the application of energizing voltage pulses thereto,
    for each electroluminescent element third and fourth photoconductive switching devices disposed in light-receiving relation thereto, and
    the fourth switching device of each electroluminescent element being series connected to the third switching device of the succeeding electroluminescent element, and a video signal circuit, said third switch device being in shunting relation to said video signal circuit.

4. The scanning apparatus of claim 3 including,
    said third switching device being shunt coupled with said fourth switching device and said video signal circuit of the preceding electroluminescent element whereby luminescence of each electroluminescent element results in disabling the coupling of said video signal circuit with said fourth switching device of said preceding electroluminescent element.

5. An apparatus of claim 4 including a transducing appartus in the form of a crossed grid matrix having a plurality of first and second orthogonally related sets of conductors, each conductor of said first set being series coupled with each said fourth switching device, a second apparatus according to claim 4 having each fourth switching device thereof series coupled with each conductor of the second set, and a plurality of video signal transducers connected to the intersections of said first and second conductors, respectively.

6. The apparatus of claim 5 in which said video signal transducers are elements of electroluminescent phosphor.

7. The apparatus of claim 5 in which said video signal transducers are elements of photoconductive material.

* * * * *

UNITED STATES PATENT OFFICE
CERTIFICATE OF CORRECTION

Patent No. 3,988,536     Dated October 26, 1976

Inventor(s) Anthony C. Moricca

It is certified that error appears in the above-identified patent and that said Letters Patent are hereby corrected as shown below:

Col. 1, line 34,    "the" first occurrence should be --in--.
Col. 3, line 28,    "cornr" should be --corner--.
Col. 3, line 40,    "assumbing" should be --assuming--.
Col. 4, line 10,    "clip" should be --chip--.
Col. 5, line 24,    "Therefoe" should be --Therefore--.
Col. 6, line 32,    "9" should be --94--.
Col. 6, line 42,    "22g" should be --24g--.
Col. 6, line 47,    "enable" should be --enabled--.
Col. 6, line 62,    "100e" should be --110e--.

Claim 3, Col. 8, line 28    "switch" should be --switching--.

Signed and Sealed this

Twenty-eighth Day of December 1976

[SEAL]

Attest:

RUTH C. MASON
*Attesting Officer*

C. MARSHALL DANN
*Commissioner of Patents and Trademarks*